United States Patent [19]

Stephan

[11] Patent Number: 5,215,212
[45] Date of Patent: Jun. 1, 1993

[54] CONTAINER FOR MAGNETIC TAPE CASSETTES

[75] Inventor: Christoph Stephan, Sommerhalde, Fed. Rep. of Germany

[73] Assignee: fischerwerke Artur Fischer GmbH & Co. KG, Tumlingen, Fed. Rep. of Germany

[21] Appl. No.: 807,172

[22] Filed: Dec. 13, 1991

[30] Foreign Application Priority Data

Dec. 14, 1990 [DE] Fed. Rep. of Germany ....... 4039954

[51] Int. Cl.$^5$ .............................................. G07F 11/04
[52] U.S. Cl. ...................................... 221/87; 221/124; 221/271; 206/387; 312/274; 312/311
[58] Field of Search ...................... 221/87, 89, 90, 124, 221/271, 273, 276, 279, 272, 280, 312 C; 206/387; 312/274, 311

[56] References Cited

U.S. PATENT DOCUMENTS

| RE. 30,184 | 1/1980 | Ackeret | 206/387 |
|---|---|---|---|
| 3,677,396 | 7/1972 | Staar | 221/87 X |
| 4,024,954 | 5/1977 | Staar | 221/87 X |
| 4,030,601 | 6/1977 | Ackeret | 206/387 |
| 4,265,369 | 5/1981 | Aboussouan | 221/87 |

FOREIGN PATENT DOCUMENTS

| 0171224 | 7/1985 | European Pat. Off. . |
|---|---|---|
| 0321937 | 12/1988 | European Pat. Off. . |
| 0383007 | 1/1990 | European Pat. Off. . |
| 2542622 | 4/1976 | Fed. Rep. of Germany . |
| 2059902 | 8/1970 | France . |
| 2274107 | 3/1975 | France . |

OTHER PUBLICATIONS

PCT/JP WO87/06210.

*Primary Examiner*—Robert P. Olszewski
*Assistant Examiner*—Dean A. Reichard
*Attorney, Agent, or Firm*—Michael J. Striker

[57] ABSTRACT

A container for magnetic tape cassettes has a housing having a plurality of receiving compartments for magnetic tape cassettes, a plurality of base plates separating the compartments from one another, a lockable slider member ejectable under a spring action to a position in which a magnetic tape cassette arranged on the base plate can be removed, resilient locks provided on the slider member and formed as pivotable rocker arms adapted to engage two reel hubs of a magnetic tape cassette, projections arranged on the base plate, and elevations. The rocker arms have laterally mounted pegs which, when the slider member is ejected, disengage the rocker arms from the reel hub by running beneath the projections, and when the slider member is inserted, engage the rocker arms in the reel hub by running on the elevations.

8 Claims, 2 Drawing Sheets

CONTAINER FOR MAGNETIC TAPE CASSETTES

BACKGROUND OF THE INVENTION

The present invention relates to a container for magnetic tape cassettes.

More particularly, it relates to such a container which has several receiving compartments for magnetic tape cassettes, separated from one another by base plates and a lockable slider member ejectable by a spring to a position in which the magnetic tape cassette can be removed.

Containers of the above mentioned general type are known in the art. The German document DE-PS 2,248,408 discloses a storage container for magnetic tape cassettes in which the magnetic tape cassettes are located flat on a slider member movable against a spring force into the container housing and then locked. Locking projections are arranged at a distance from one another side-by-side on the slider member, or one behind the other where the magnetic tape cassettes are inserted longitudinally. The locking projections engage the hub on recording tape reels of the magnetic tape cassettes to prevent them from turning. The locking projections are rigid. Therefore, the slider member has to be ejected a corresponding distance out of the housing in order to remove the magnetic tape cassette or to place it on the slider member from above.

The German document DE-PS 2,462,769 discloses a container for a magnetic tape cassette in which locking devices formed as pivotable rocker arms lock into the reel hubs of the magnetic cassette as the slider member is pushed in and engage them again when the slider member is adjusted. This operational principle requires however the sliding member to be ejected sufficiently far out of the housing for the reel hub to be exposed, so that the rocker arm can be disengaged from it. Since both reel hubs of the cassette have to be immobilized to secure the tape, this means that when the cassette is inserted longitudinally and the locking devices are arranged one behind the other, the slider has to be ejected virtually completely out of the housing. When such a container is used in motor vehicles the space for the slider member to be ejected such a distance is very frequently not available. Moreover, the ejection of such a distance requires spring elements with correspondingly long spring travels, and the travel member constructions with guides corresponding to the ejection travel. Furthermore, the disengagement depends on a predetermined spring action of the rocker arm which in the engaged state is under constant stress. The spring action weakens through fatigue and after a certain time a reliable disengagement cannot be guaranteed.

SUMMARY OF THE INVENTION

Accordingly, it is an object of the present invention to provide a container for magnetic tape cassettes which avoids the disadvantages of the prior art.

In keeping with these objects and with others which will become apparent hereinafter, one feature of the present invention resides, briefly stated, in that the rocker arms have laterally mounted pegs which, as a slider member is ejected, disengage the rocker arm from the reel hub by running beneath projections arranged on the base plate, and as the slider member is inserted they engage the rocker arm in the reel hub by running onto elevations.

As the slider member is ejected, the peg mounted laterally on the pivotable rocker arm slides beneath a projection arranged on the base plate. The rocker arm is thereby disengaged from the reel hub. The travel for the disengagement of the rocker arm is determined by the distance of the peg mounted on the rocker arm from the projection arranged on the base plate. The disengagement travel is therefore independent of the ejection travel of the slider member. It is therefore sufficient to eject the slider member far enough for the magnetic tape cassette to be readily gripped. Since the locking devices are disengaged, the cassette can be removed by withdrawing from the receiving compartment.

As the slider member is pushed in with the cassette positioned on it, the peg runs on an elevation arranged opposite to the projection and bring the pivotable rocker arm into engaged position. Both the disengaged position and the engaged position are fixed by the projections and elevations respectively. Therefore a proper operation of the rocker arm as locking means is guaranteed even with the frequent use.

In order to insert the magnetic tape cassette transversely, the two locking devices arranged side-by-side. In the case of the longitudinal insertion they are arranged in alignment one behind the other in the sliding direction.

In the event the magnetic tape is to be inserted longitudinally, it is advantageous for each locking device to be formed by two rocker arms arranged side-by-side and pivotable independently of one another. A projection is provided on the base plate to be associated with each rocker arm for common disengagement thereof. For the engagement of the rocker arms only one elevation is provided for the two rocker arms of a locking device arranged in pairs. The elevation is arranged on the sliding element mounted on the base plate and displaceable by the magnetic tape cassette transversely to the insertion direction. This construction for a longitudinal insertion of a magnetic tape cassette allows the tape to be mobilized regardless of the position in which the cassette is placed on the slider member. The reel hubs of the cassette are arranged offset from the middle in the longitudinal direction of the cassette. Therefore only the rocker arm lying offset in the same direction is engaged.

Since the elevation arranged on the sliding contact in each case pushed upright only one rocker arm for engagement the other rocker arm remains in the disengaged position. The respective matching rocker arm is thereby brought into engagement, in that the sliding element is replaced with the elevation arranged on it by the magnetic tape cassette. The displacement of the sliding element is performed by way of the enlargement arranged on the cassettes and coming into contact with an inclined stop member of the sliding element passing through the upper side of the base plate.

In accordance with another feature of the present invention the rocker arm can be injection molded in one piece with the slider member. Therefore it is connected to the slider member by an integral hinge. The elevations and projections can be provided with ramps for actuation of the rocker arm.

In order to protect the magnetic tape cassette from dust and dirt, it is advantageous in accordance with another feature of the present invention to mount a pivotable closure flap on the slider member with an integral hinge. The closure flap can be immobilized in a closed and open end position by a leaf spring biased between the slider member and the closure flap.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
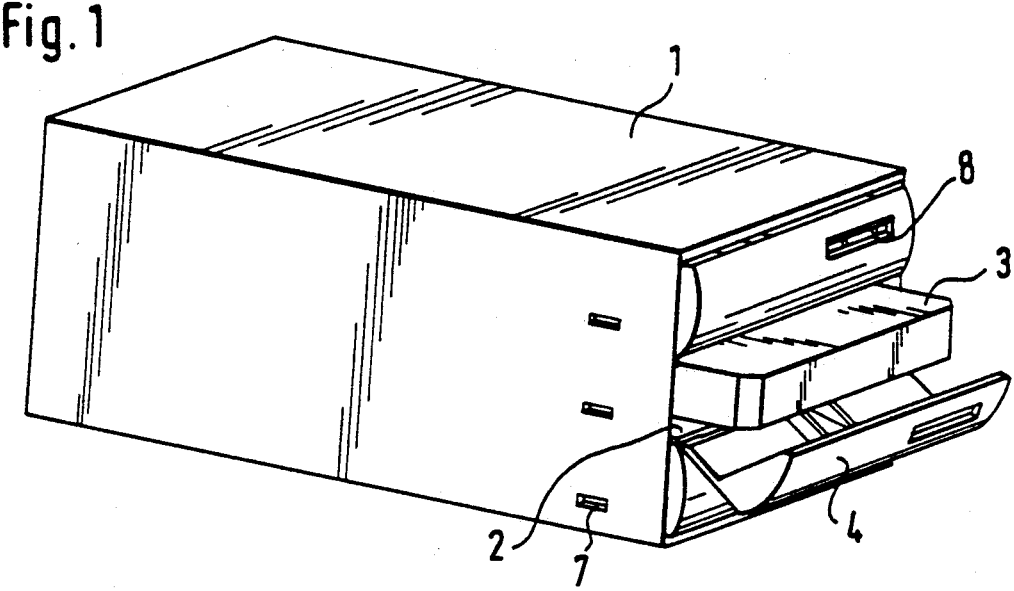
FIG. 1 is a perspective view showing the container with several receiving compartments for magnetic tape cassettes.

A container for magnetic tape cassettes is identified as a whole with reference numeral 1. As can be seen in FIG. 1 the container 1 has three receiving compartments 2 in which magnetic tape cassettes 3 can be received. A closure flap 4 for a middle receiving compartment is opened for removal of the magnetic tape cassette. Each receiving compartment is formed by a base plate 5 inserted in rails provided on side walls of the container 1. The base plate is immobilized in apertures 7 of the side walls by locking projections 6. In order to determine whether a cassette is inserted in the compartment 2 without opening of the closure flap 4, the closure flaps have openings 8.

Figure 2:
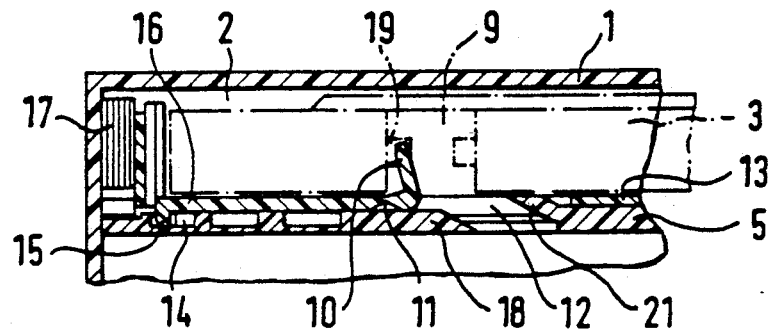
FIG. 2 is a side view of a locking device of the container in accordance with the present invention.
Figure 2A:
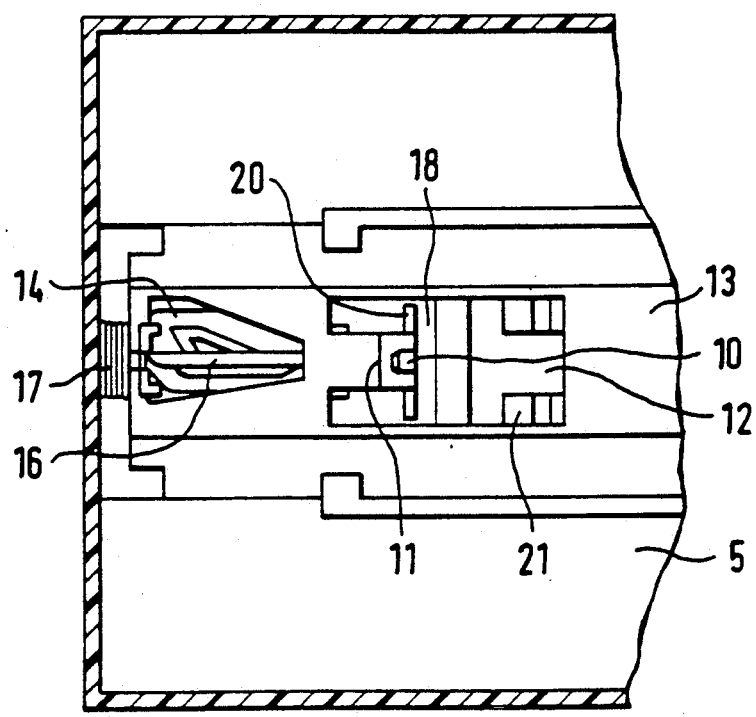
FIG. 2a is a plan view of the locking view of the inventive container.

The magnetic tape cassette 3 has two reel hubs 9 secured against turning with locking devices shown in FIGS. 2 and 2a. The locking device has a rocker arm 10 which is mounted by an integral hinge 11 in a recess 12 on a slider member 13. The slider member 13 is guided in the base plate 5 which serves to divide the container into the receiving compartments 2. A groove-shaped curved path 14 is machined in the base plate 5 at the rear end thereof. Together with a tongue 16 arranged on the slider member 13 and engaging with a projection 15 into the curved path 14, it forms a closure mechanism. The closure mechanism can be both locked and unlocked by pressure applied to the slider member.

In the shown position the slider member 13 with the magnetic tape cassette is fully inserted and locked under a biasing action of a spring element 17. When the slider member 13 is inserted, the rocker arm 10 runs onto an elevation 18 which is molded on the base plate 5 and as a result snaps into a toothed configuration 19 of the reel hub 9 of the magnetic tape cassette 3. The reel hub is thereby prevented from turning. If the slider member is unlocked and displaced by the spring 17 to the removal position, the rocker arm 10 slides down off the elevation 18. Since pegs 20 arranged on it run beneath the oppositely located projections 21 of the base plate 5 it is pressed downwards and disengages the reel hub. After the disengagement the cassette can be drawn by hand completely out of the receiving compartment.

The locking device shown in FIGS. 2 and 2a is suitable both for transverse insertion of the cassettes, in which the locking devices are arranged side-by-side on a correspondingly wide sliding member, and also for longitudinal insertion provided that the cassette is always pushed in in the same position.

Figure 3:
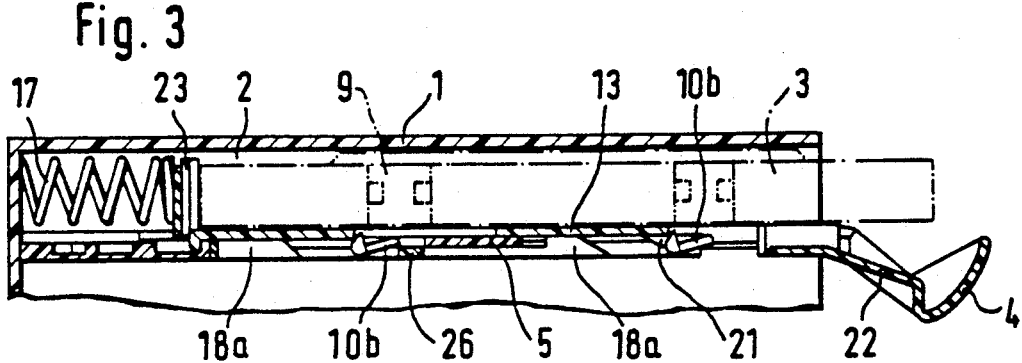
FIG. 3 is a view showing a receiving compartment for a magnetic tape cassette inserted longitudinally with a base plate and a sliding member in an injected position.
Figure 4:
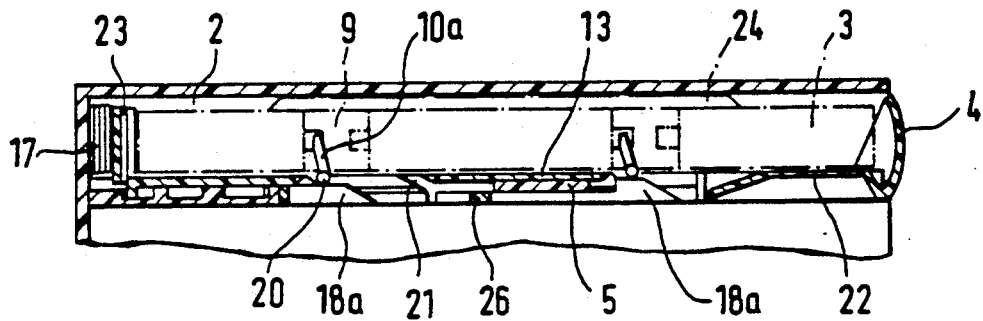
FIG. 4 is a view showing a receiving compartment shown in FIG. 3 with the slider member in the inserted position.
Figure 5:
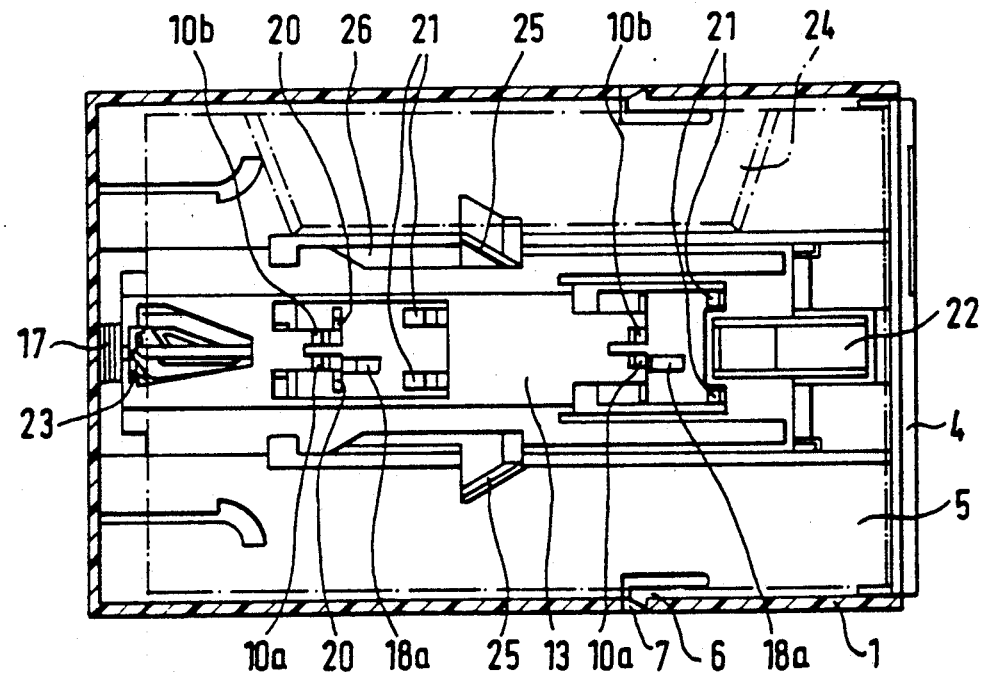
FIG. 5 is a plan view of the base plate with the slider inserted as shown in FIG. 4.

In the embodiment shown in FIGS. 3-5 it is possible to insert the cassette longitudinally in both positions. This is achieved in that the locking devices are formed by two rocker arms 10a and 10b arranged side-by-side and pitovably independently from one another. The pegs 20 are arranged on them projecting at right angles. Each of the rocker arms is offset from the middle by the same distance as the reel hub 9 of a magnetic tape cassette 3. When the slider member 13 is ejected all four rocker arms are disengaged by the projections 21 associated with each rocker arm. At the same time the cassette is pushed by the slider member 13 to the removal position. In order to withdraw the cassette from the receiving compartment 2, the closure flap held in the extended position by an angle leaf spring 22 is pressed downwards. The band in the leaf spring 22 also immobilizes the closure flap in this position.

The cassette 3 in FIGS. 4 and 5 is inserted in the receiving compartment 2. First of all, when the closure flap 4 is opened, the cassette is pushed until it meets a stop 23 arranged on the slider member 13. When the cassette is inserted, a cassette enlargement 24 located on one side pushes away a wedge-shaped control element 25 of a sliding element 26 lying on the same side. It displaces the sliding element transversely to the direction of insertion of the cassette into the opposite end position. After the closure flap 4 has been folded up, in which closure position it is again immobilized by the leaf spring 22, the slider member 13 is then pushed with the inserted cassette 3 into the receiving compartment 2. Due to the displacement of the sliding element 26, two elevations 18a arranged on the sliding element 26 and aligned with one another are also displaced until only the rocker arms 10a matching the position of the magnetic tape cassette run onto the two aligned elevations 18a to engage the reel hubs 9.

It will be understood that each of the elements described above, or two or more together, may also find a useful application in other types of constructions differing from the types described above.

While the invention has been illustrated and described as embodied in a container for magnetic tape cassettes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A container for magnetic tape cassettes, comprising a housing having a plurality of receiving compartments for magnetic tape cassettes; a plurality of base plates separating said compartments from one another; a lockable slider member ejectable under a spring action to a position in which a magnetic tape cassette arranged on said base plate can be removed; resilient locking means provided on said slider member and formed as pivotable rocker arms adapted to engage two reel hubs of a magnetic tape cassette; projections arranged on said base plate; elevations, said rocker arms having laterally mounted pegs which, when the slider member is ejected, disengage said rocker arms from the reel hub by running beneath said projections, and when said slider member is inserted, engage said rocker arms in the reel hub by running on said elevations, wherein said locking means being arranged in an insertion direction of said slider member so that a longitudinal insertion of the magnetic tape cassette is possible, each of said locking means being formed by two of said rocker arms arranged side-by-side and pivotable independently of one another, said base plate being provided with projections associated with each rocking arm for its disengagement; and a sliding element mounted on said base plate and displaceable by a magnetic tape cassette transversely to the insertion direction, displacement of said sliding element causing a respective elevation to be arranged for engagement of one of said two rocker arms of said locking means.

2. A container as defined in claim 1; and further comprising wedge-shaped control members arranged on two longitudinal sides of said slider element and penetrating said base plate so as to project above an upper side of said base plate for displacement of said sliding element by a cassette enlargement.

3. A container as defined in claim 1; and further comprising means for attaching said rocker arm to said slider element.

4. A container as defined in claim 3, wherein said attaching means includes an integral hinge which attaches said rocker arm to said slider element.

5. A container as defined in claim 1, wherein said elevations and said projections are provided with ramps.

6. A container for magnetic tape cassettes, comprising a housing having a plurality of receiving compartments for magnetic tape cassettes; a plurality of base plates separating said compartments from one another; a lockable slider member ejectable under a spring action to a position in which a magnetic tape cassette arranged on said base plate can be removed; resilient locking means provided on said slider member and formed as pivotable rocker arms adapted to engage two reel hubs of a magnetic tape cassette; projections arranged on said base plate; elevations, said rocker arms having laterally mounted pegs which, when the slider member is ejected, disengage said rocker arms from the reel hub by running beneath said projections, and when said slider member is inserted, engage said rocker arms in the reel hub by running on said elevations; and a pivotable closure flap mounted on said slider member and immobilizable in an extended and folded-up position; and means for immobilizing said pivotable closure flap.

7. A container as defined in claim 6, wherein said immobilizing means includes a leaf spring biased between said sliding member and said closure flap.

8. A container as defined in claim 6; and further comprising means for connecting said pivotable closure flap with said slider member and including an integral hinge.

* * * * *